United States Patent [19]
Krieg

[11] Patent Number: 6,009,956
[45] Date of Patent: Jan. 4, 2000

[54] METHOD AND APPARATUS FOR DISTRIBUTING FLUID TO A LEACH FIELD SURFACE

[76] Inventor: Ingo Krieg, 4155 Lakeside Dr., Jacksonville, Fla. 32210

[21] Appl. No.: 09/063,385

[22] Filed: Apr. 21, 1998

[51] Int. Cl.[7] ....................................................... B05B 3/18
[52] U.S. Cl. .................... 172/438; 239/198; 137/355.12; 137/355.17
[58] Field of Search ........................ 239/198; 137/355.12, 137/355.16, 355.17, 355.18, 355.19, 172.438

[56] References Cited

U.S. PATENT DOCUMENTS

| | | |
|---|---|---|
| 1,761,191 | 6/1930 | Browning . |
| 2,174,600 | 10/1939 | Scutmaat . |
| 2,570,573 | 10/1951 | Liboiron . |
| 3,446,235 | 5/1969 | Linderman . |
| 3,516,609 | 6/1970 | Gheen et al. . |
| 4,181,257 | 1/1980 | Moisan . |
| 4,488,683 | 12/1984 | Chiel .............................. 137/355.12 X |
| 5,005,806 | 4/1991 | Krauth . |

*Primary Examiner*—Christopher J. Novosad
*Attorney, Agent, or Firm*—Pillsbury Madison & Sutro LLP, Intellectual Property Group

[57] ABSTRACT

An apparatus for distributing fluid onto a hydrometallurgy leach field consists of individual modules having structure for operatively coupling the modules to one another to form the apparatus. Each module, which alone can form a fluid distribution apparatus, includes a frame and an elongated reel assembly on which a plurality of individual distributors, such as perforated hoses, are carried at axially spaced positions along the elongated reel assembly. A fluid supply conduit carries fluid from a fixed fluid supply line through the elongate reel assembly to each of the hoses carried on the elongated reel assembly and to an adjacent module. The frame is supported at its ends by frame translating mechanisms, preferably endless track crawler units, which serve to selectively move the apparatus forward and rearward. Adjacent modules are coupled at respective ends thereof to a common frame translating mechanism, thus coupling the adjacent modules to one another. To distribute fluid onto the leach field, the apparatus is moved forward over the leach field heap while simultaneously unrolling the plurality hoses to deploy the hoses in a closely spaced parallel arrangement over the leach field heap. With the hoses deployed, fluid is run through the hoses and out of the perforations thereof and onto the leach field surface. After leaching is complete, the hoses are then rolled onto the elongated reel assembly and the apparatus is moved to a different part of the leach field to re-deploy the hoses.

19 Claims, 11 Drawing Sheets

METHOD AND APPARATUS FOR DISTRIBUTING FLUID TO A LEACH FIELD SURFACE

BACKGROUND OF THE INVENTION

The present invention relates to an apparatus for distributing fluid to a leach field in the practice of the art of hydrometallurgy.

The art of hydrometallurgy is described in some detail in U.S. Pat. No. 5,005,806, the disclosure of which is hereby incorporated herein by reference. In essence, hydrometallurgy is the art of recovering metals from ores by separating a solution of the metal in the form of a salt from the ore, then decomposing the metallic salt in such a way to cause precipitation of the metal from the solution. The leaching solution, or lixiviant, used depends on the particular metal being leached from the ore. For example, gold and silver are typically reclaimed from low grade ore using lixiviants generally constituting aqueous solutions of sodium cyanide mixed with oxygen to convert the metal to a soluble salt from which the metal can be recovered by precipitation. Leaching solutions of sulfuric acid or sulfuric acid-sulfate are typically used for leaching copper from an ore.

In the commercial practice of hydrometallurgy, a bed of run-of-mine or granular low grade ore, known as a heap, is spread over an impervious base or pad which may comprise sheets of plastic film, asphalt and/or compacted clay. Crushed ore is normally heaped onto the pad to a depth to 10 to 30 feet and leveled off at the top of the heap. The ore is typically pre-crushed to a desired size. For example, for copper mining, the ore may be crushed to one quarter inch granular size.

After the heap has been prepared, the target metal is leached from the ore by circulating the leaching solution through the heap in a process commonly known as percolation. To effect percolation, the solution is distributed over the top of the heap and permitted to seep down through the heap to the impervious pad. The impervious pad is typically sloped toward a drain pipe or channel for recovering the metal laden solution. The liquid that is distributed over the top of the heap may be a leaching solution comprising water mixed with a leaching agent, or a leaching agent may be premixed with the ore before the ore is spread onto the heap and relatively pure water is percolated through the heap. For example, in copper ore mining, sulfuric acid is mixed with one quarter inch crushed copper ore before the ore is spread onto the heap, and pure water is percolated through the heap to mix with the sulfuric acid and leach the copper from the ore.

Various systems have been used for distributing water over a leach field. For example, sprayers or sprinklers may be positioned at various locations on the heap to spray and distribute water or leaching solution over the top of the surface. Liquids distributed in such a manner are prone to rapid evaporation and degradation by exposure to air and ultra violet rays, and in addition, can be prone to freezing in cold weather operations. In addition, spraying techniques can result in surface puddling and run-off, raising the threat of channeling problems and potentials for blowouts.

U.S. Pat. No. 5,005,806 discloses a liquid distribution system which includes main line pipes extending longitudinally along a side of the heap and header pipes extending at spaced intervals from the main line pipe transversely across the heap generally parallel to one another. Extending in both directions across the heap from the header pipes are a plurality of generally parallel, closely spaced tubes. Liquid flows from the main line pipes, into the header pipes and into the tubes, and each tube has a plurality of spaced emitters secured thereon for directing the leaching solution onto the ore bed.

The general layout of a conventional copper ore leaching operation is shown in FIG. 1. The lay-out of the leach field 10 is generally that of an oval track having a first straight portion 12 a second straight portion 14 and first and second turning areas 20, 22. To make such an operation commercially viable, it is typically necessary that such a field be extremely large. For example, in commercial operations, each of the straight portion 12 and 14 may be up to 400 meters wide and 1.6 kilometers long, and the depth of the heap may be six meters.

In the leach field operation shown in FIG. 1, heaps are formed along the first and second straight portions 12 and 14 by a traveling stacker conveyor system 32, and spent ore is removed from the straight portions by traveling cleaner conveyer system 24. Copper laden ore mixed with sulfuric acid is brought into the field from a remote crusher and mixer along an underground inlet conveyer 16. The stacker conveyer assembly 32 branches off the inlet conveyer 16. Stacker conveyer system 32 includes a stacker conveyer 34 extending transversely across the straight portion 12 or 14 from the inlet conveyer 16. The stacker conveyer system 32 travels clockwise on the leach field shown in FIG. 1 supported on a plurality of endless track crawlers 36 which are typically powered by electrically powered hydraulic systems. A stacker mechanism (not shown) travels back and forth along the stacker conveyer 34 and distributes ore from the conveyer 34 onto the heap. The rate of movement of the stacker conveyer system 32 about the leach field 10 and the rate of movement of the stacker along the stacker conveyer 34 are preferably set so as to create a relatively evenly distributed heap of about 6 meters in depth. The heap is formed only on the straight portions 12 and 14 from the beginning 11 of straight portion 12 to the end 13 thereof and from the beginning 17 of straight portion 14 to the end 15 thereof.

In a conventional hydrometallurgy operation, such as that previously described, water is distributed to the heap to effect the leaching percolation in a manner similar to that disclosed in U.S. Pat. No. 5,005,806. That is, main pipes 40 and 38 bring fluid from a remote source to the leach field 10, a plurality of header pipes (not shown) extend transversely from the pipes 38 and 40 across the leach fields, and pluralities of closely spaced, generally parallel hoses (not shown) extend from the header pipes in both directions across the top of the heap. Rather than using specially designed emitters, however, the hoses are typically perforated at numerous locations along their respective lengths so as to allow fluid to leak therefrom onto the heap. The copper laden solution is directed by the impervious pad beneath the heap toward recovery pipes 42 and 44 which direct the solution to a facility at which the copper can be precipitated from the solution.

After the ore has been sufficiently leached, the spent ore is removed from the field by a traveling cleaner conveyer system 24. Cleaner conveyer system 24 comprises a conveyer 30 supported for clockwise translation about the leach field 10 on a plurality of endless track crawler mechanisms 28. A cleaner mechanism 26, typically comprising a rotary shovel device, travels up and down the cleaner conveyer 24, scooping spent ore from the heap onto the conveyer 30, which directs the spent ore towards the central underground conveyer and away from the leach field 10 through an outlet conveyer 18. Accordingly, as shown in FIG. 1, the area to the right of the cleaner conveyer system 24 is a cleaned area from which spent ore has been removed, and the area to the left of the conveyer system is a heap of spent ore or ore which is presently undergoing a percolation procedure.

It can be appreciated that the stacker conveyer system 32 and the cleaner conveyer system 24 follow each other about the leach field 10, the stacker conveyer system 32 distributing a heap of ore, and the cleaner conveyer system 24 removing the spent ore after percolation has been performed on the ore. The turning areas 20 and 22 are provided so as to permit the continuous forward translation of the stacker conveyer system 32 and cleaner conveyer system 24.

The previously described method of distributing water over the leach fields suffers from a number of disadvantages. The header pipes extending across the heaps from the main pipes 38 and 40 and the numerous perforated tubes extending from the header pipe across the heaps are typically assembled and disassembled using manual labor. The shear magnitude of the manual effort necessary to assemble and disassemble the fluid distribution systems can be appreciated when considering the overall size of the leach fields, typically 400 by 1600 meters in size. Accordingly, the assembly and disassembly of the fluid distribution system is incredibly labor and time intensive. In addition, the numerous tubes and pipes which must be manually assembled and disassembled are subject to damage and entanglement due to their frequent handling. Because the pipes and tubes are to be manually handled, they must necessarily be of light weight materials which makes them more susceptible to damage, especially in the rugged environment of a leach field operation. Also, because of the frequent connecting and disconnecting of the header pipes and the frequent connecting and disconnecting of the tubes to and from the header pipes, it is necessary that the connectors used be connectors capable of easy connecting and disconnecting. Such connectors are typically susceptible to wear and fatigue and therefore are prone to malfunction and require frequent replacement.

SUMMARY OF THE INVENTION

It is an object of the present invention to provide a robust mechanized apparatus for deploying and retrieving a fluid distributing hose arrangement that overcomes the disadvantages suffered by prior art leach field fluid distribution systems which require manual deployment and retrieval.

This object is achieved by providing a mobile apparatus for distributing fluid to a surface. The apparatus comprises a frame structure, an axially elongated reel assembly rotatably carried by the frame structure, a plurality of flexible tubes carried on the axially elongated reel assembly at different axially spaced positions along the axially elongated reel assembly, and a frame transport mechanism constructed and arranged to support the frame structure and to transport the frame structure in a forward or rearward direction. The axially elongated reel assembly further includes an interior fluid flow passage to transmit fluid from an external fluid supply to each of the plurality of flexible tubes.

The mechanized apparatus drastically reduces the amount of manual labor required for deploying and retrieving the hose system. In addition to the savings of manual labor costs, the apparatus provides further cost effectiveness in that, because the pipe and hose arrangement does not require manual deployment, heavier, more robust components may be used, which are more durable than the components used in prior art arrangements. Accordingly, less frequent part replacement and less down time due to breakdowns would be expected.

It is a further object of the present invention to provide an apparatus that is modular so that a fluid distribution apparatus of a size needed for a commercial hydrometalurgy leach field can be easily assembled and disassembled and further to provide an apparatus that can be accommodated by existing leach field set-ups with little or no modification of the leach field required.

This object is achieved by a mobile apparatus for distributing fluid onto a surface. The apparatus comprises a plurality of elongated frames arranged end-to-end, each of the elongated frames having structure for operatively coupling opposed ends thereof to adjacent elongated frames. A frame propulsion mechanism is associated with each end of each elongated frame for supporting each end and for propelling the plurality of elongated frames in unison. Each elongated frame includes propulsion mechanism coupling structure at each end thereof, and each said frame propulsion mechanism includes frame coupling structure constructed and arranged to (1) be engaged by the propulsion mechanism coupling structure of a first associated elongated frame to operatively couple the first associated elongated frame to the frame propulsion mechanism and (2) to be engaged by the propulsion mechanism coupling structure of a second associated elongated frame adjacent to the first associated elongated frame to operatively couple the second associated elongated frame to the frame propulsion mechanism and to couple the second associated elongated frame to the first associated elongated frame. An axially elongated reel assembly is rotatably carried by each elongated frame, each axially elongated reel assembly being constructed and arranged to support thereon a plurality of lengths of flexible tubing wound upon the axially elongated reel assembly at different axial positions therealong. Each axially elongated reel assembly includes a fluid passageway extending along the axially elongated reel assembly, primary connection devices disposed at opposite ends of the fluid passageway for coupling an end of the fluid passageway in fluid communication with either an external fluid source or a fluid passageway of an axially elongated reel assembly of an adjacent elongated frame, and a plurality of secondary connection devices disposed at spaced apart positions along the fluid passageway for connecting a length of flexible tubing in fluid communication to the fluid passageway.

These and other features of the present invention as well as methods of use and construction will become more apparent during the course of the following detailed description and appended claims. The invention may best be understood with the reference to the accompanying drawings wherein an illustrative embodiment is shown.

DETAILED DESCRIPTION OF THE PREFERRED EMBODIMENT

For convenience in the following description, various directional or other spatial references are made with regard to references to the drawings. It is understood, however, that such references, including without limitation, upper, lower, top, bottom, left, right, lateral, or longitudinal, are made for convenience only and should not be construed to be limiting on the invention described herein.

Figure 1:
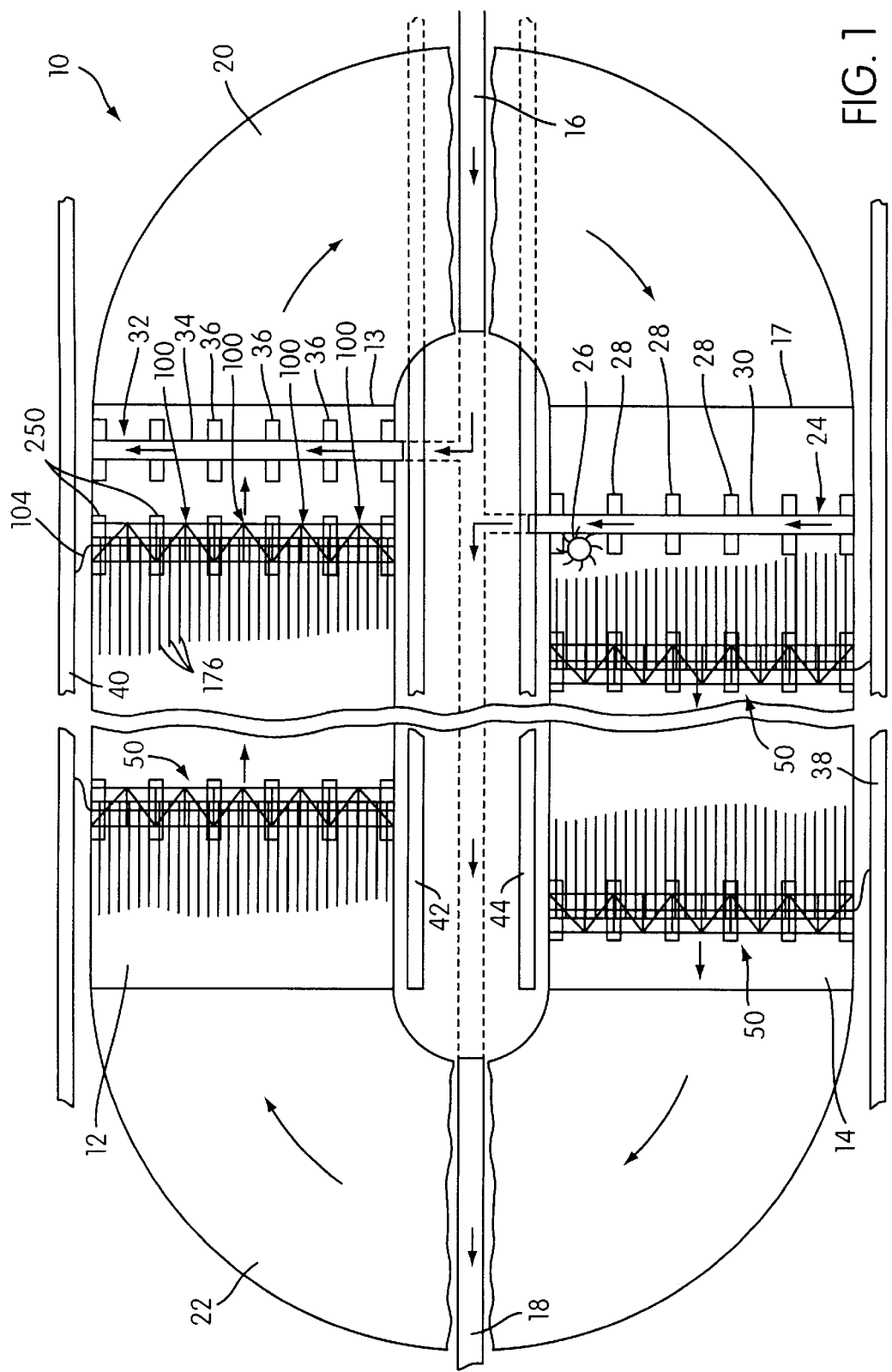
FIG. 1 is a schematic plan view of a leach field operation on which the apparatus for distributing fluid to a leach field of the present invention is employed.

An apparatus for distributing fluid to the leach field 10 of FIG. 1 is designated generally by reference number 50. In the illustrated leach field 10, four apparatuses 50 are shown. The two apparatuses 50 shown on the upper straight portion 12 are coupled to fluid pipe 40 and the two apparatuses 50 shown on the lower straight portion 14 are coupled to the main pipe 38.

Figure 2:
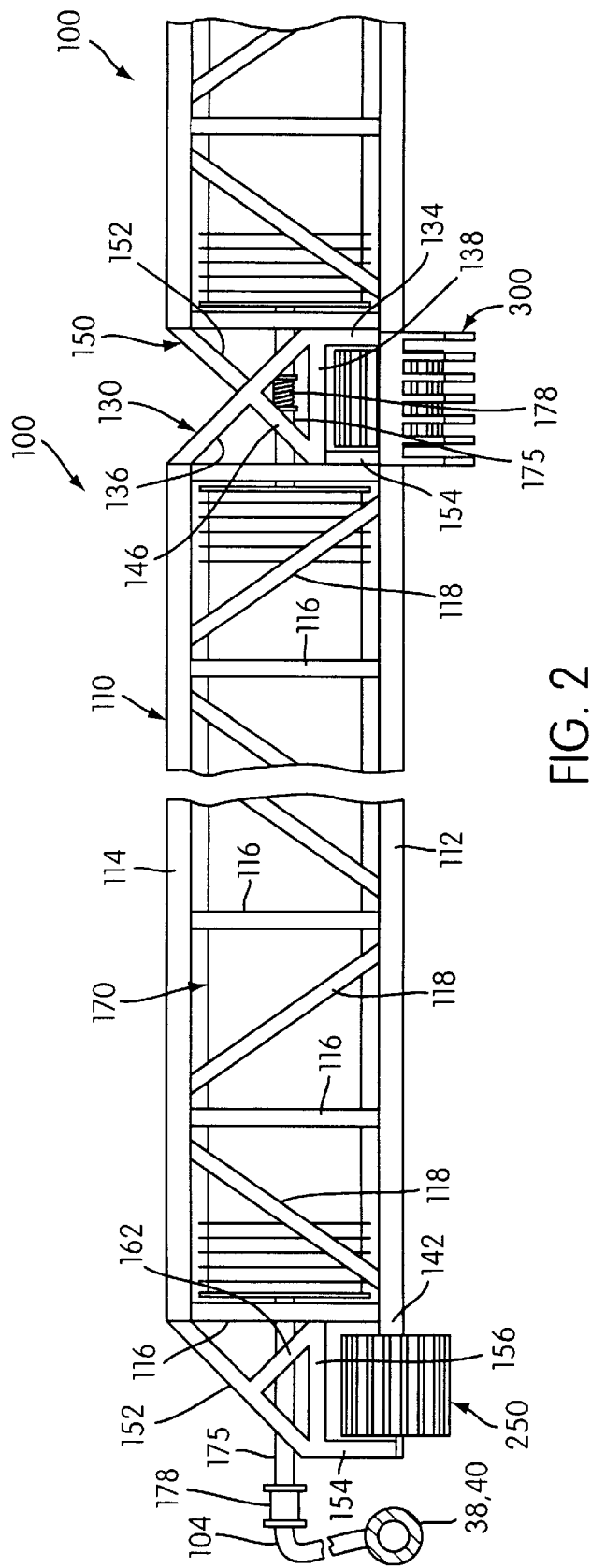
FIG. 2 is a broken rear elevation of the apparatus of the present invention.

Each apparatus 50 preferably includes a plurality of individual modules 100 coupled together end to end to form the apparatus 50. As shown in FIG. 2, each individual module 100 includes a frame 110 supporting therein an axially elongated reel assembly 170. Each frame 110 is supported at opposite ends thereof by a frame translating mechanism, preferably in the form of an endless track crawler unit 250, and adjacent frame assemblies 110 of adjacent individual modules 100 are coupled to one another at the crawler unit 250 positioned therebetween. Each of the crawler units 250 is power driven either in a forward or rearward direction so that the entire apparatus 50 can translate back and forth on the leach field 10 and can travel in a clockwise direction about the leach field track as do the stacker conveyer system 32 and the cleaner conveyer system 24 described above.

Each frame 110 is preferably about forty meters long. That is, the spacing between adjacent crawler units 250 is forty meters. The spacing between the crawler units 250 of the fluid distributing apparatus 50 is preferably the same as the spacing between the crawler units 36 of the stacker conveyer system 32 and the spacing between the crawler units 28 of the cleaner conveyer system 24. The spacings between the adjacent crawler units of the fluid distributing apparatus 50, the stacker conveyer system 32 and the cleaner conveyer system 24 are preferably all the same because as each system traverses the leach field 10 and passes over the underground inlet conveyer 16 at the first turning area 20 and outlet conveyer 18 at the second turning area 22, the respective crawler units travel over spaced-apart bridge structures (not shown) which support the weight thereof as the system passes over conveyers. The bridge structures are spaced apart by the same distance as the crawlers. Because the spacing between crawler units 250 of the fluid distributing apparatus 50 is the same as the spacings between the crawler units of the cleaner and stacker conveyor assemblies, and, therefore, the same as the spacing between the bridge structures, the fluid distributing apparatus 50 can be used in a conventional leach field arrangement without requiring substantial modification of the leach field.

Figure 3:
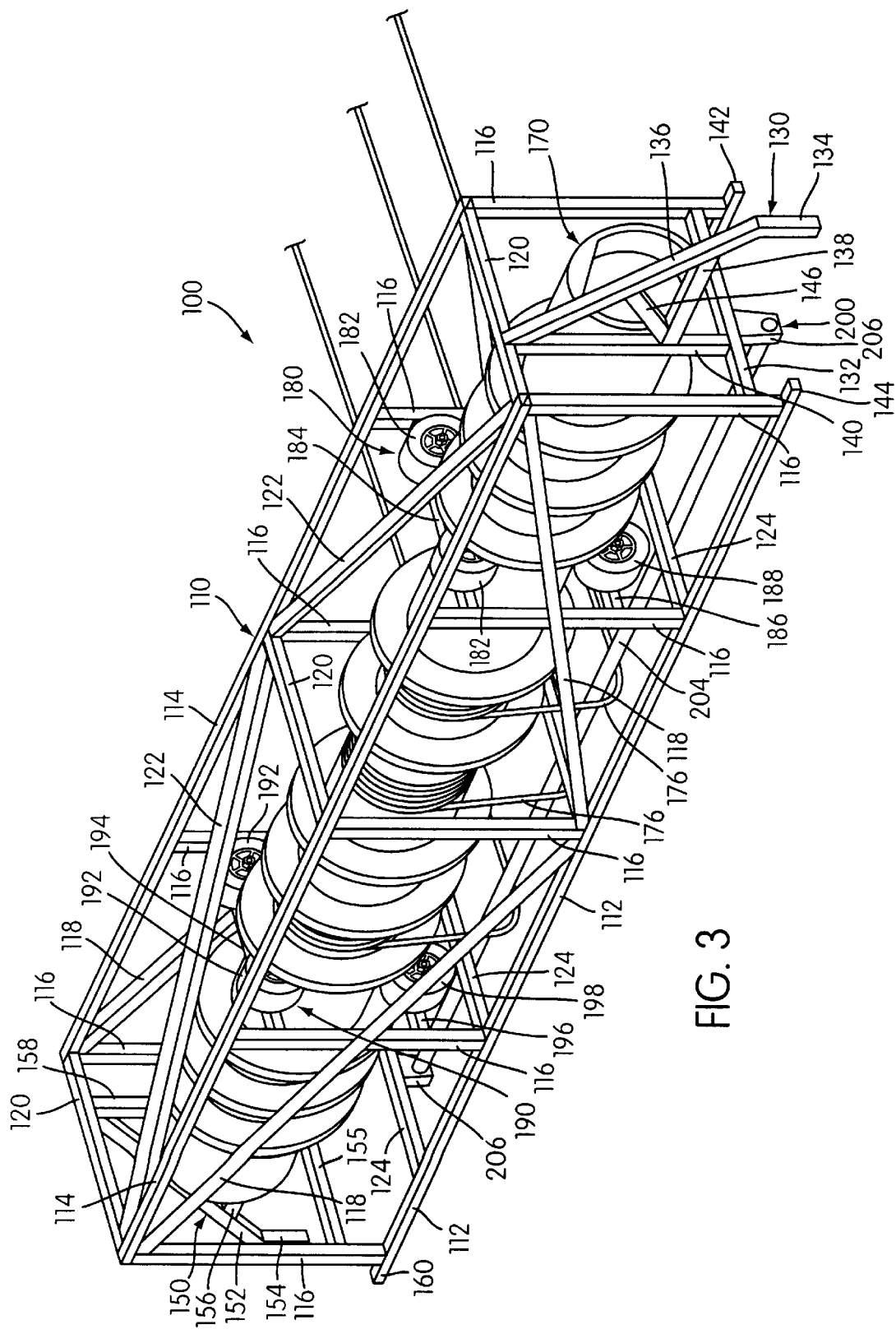
FIG. 3 is a perspective view of a frame and reel assembly of the apparatus of the present invention.

As shown in FIGS. 2–5, the frame 110 preferably comprises front and back upper longitudinal stringers 114 arranged in a spaced apart parallel relation and lower front and back longitudinal stringers 112 disposed directly below the upper longitudinal stringers 114. The upper and lower longitudinal stringers 114, 112 are connected to one another and spaced apart from one another by a plurality of vertical stringers 116 extending therebetween. The front and back longitudinal stringers are spaced apart from and coupled to one another by upper lateral stringers 120 and lower lateral stringers 124 extending therebetween. Lateral angled brace members 122 extend diagonally between the front and back upper longitudinal stringers 114 and vertical angled brace members 118 extend from the upper longitudinal stringers 114 to lower longitudinal stringers 112 between adjacent vertical stringers 116, such as shown in FIG. 2, or as shown in FIG. 3. The angled brace members 122, 118 provide additional vertical, lateral, and torsional stiffness to the frame 110.

The various frame members are preferably constructed of tubular and/or angular steel material and are held together by mechanical fasteners, such as bolts or rivets, and/or by welding.

Figure 5:
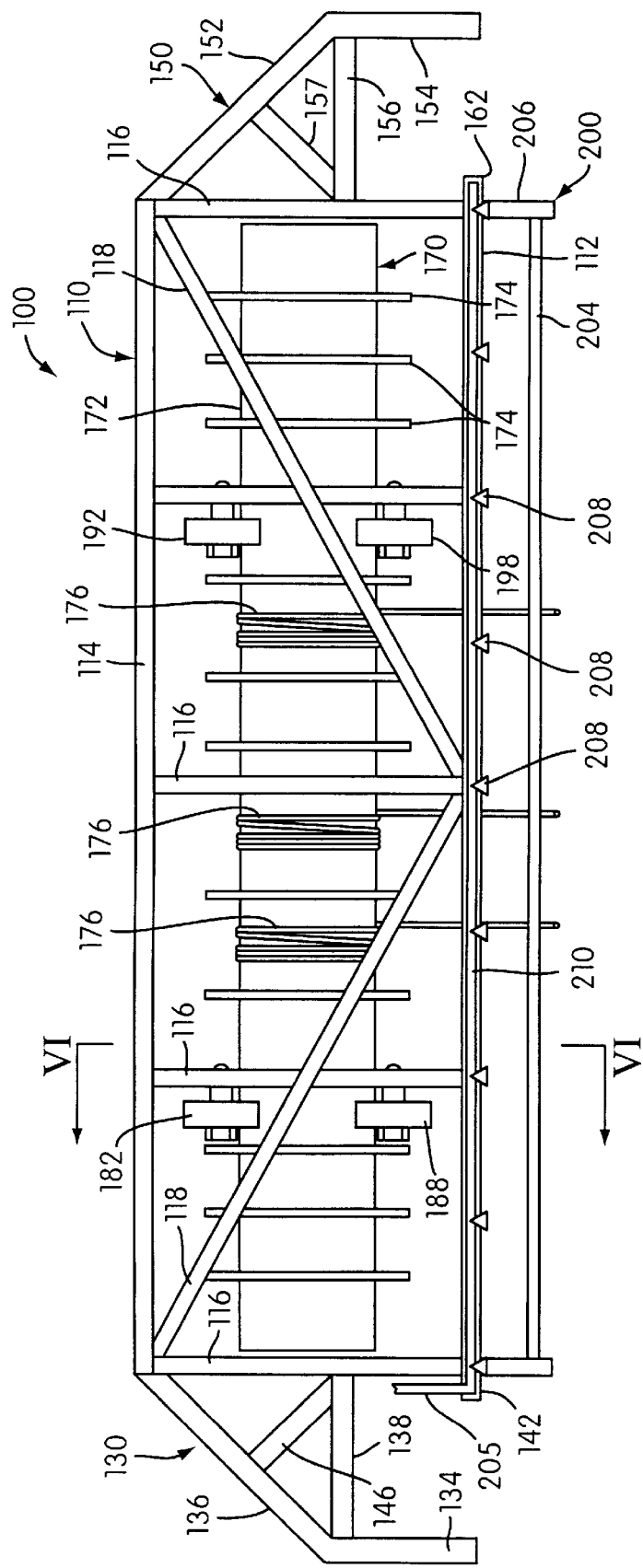
FIG. 5 is a rear elevation of the frame and reel assembly of the apparatus of the present invention.
Figure 6:
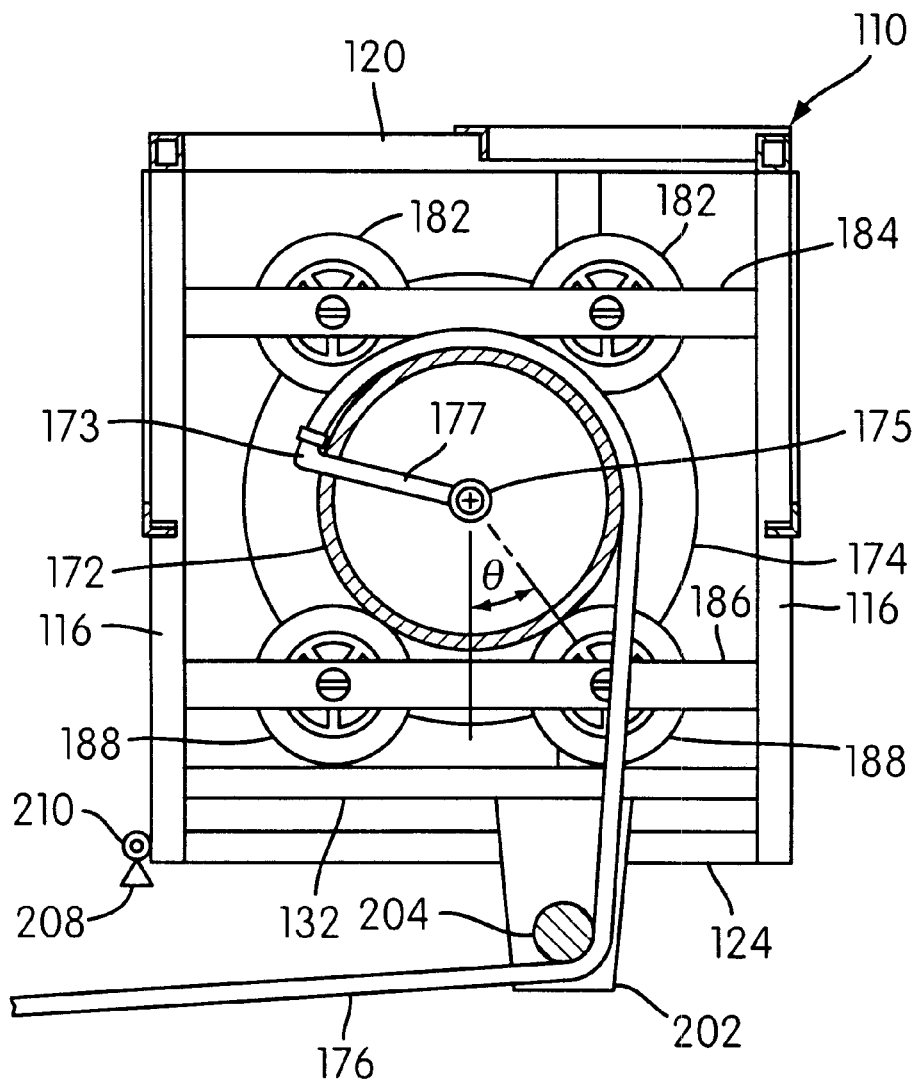
FIG. 6 is a cross section along the line "VI—VI" in FIG. 5.

As shown in FIGS. 3, 5 and 6, the axially elongated reel assembly 170 is supported within the frame 110. The reel assembly 170 includes a reel 172, which is preferably an elongated continuous tubular structure, and a plurality of axially spaced, radially extending divider members 174 disposed along the reel 172.

The reel 172 is mounted for rotation about its longitudinal axis of rotation within the frame 110 by reel support assemblies 180, 190. Reel support assembly 180 includes upper roller elements 182 rotatably mounted on an upper cross brace 184 and lower roller elements 188 rotatably mounted on a lower cross brace 186. The upper and lower roller elements 182, 188 are arranged so that a diagonal line connecting diagonally opposed upper and lower roller elements passes through the axis of rotation of the reel 172. As shown in FIG. 6, the lower roller elements 188 are arranged so as be symmetrically spaced from the center of the reel 172 and are positioned so that an angle θ between a vertical line extending through the axis of rotation of the reel 172 and a line extending through the axes of rotation of the reel 172 and a roller element 188 is preferably in the range 30 to 40°, and most preferably about 35°. With the roller elements 188 disposed in this manner, the reel 172 is supported in a stable manner on the roller elements 188 with a large component of the weight of the reel 170 acting through the connection point of the roller element 188 to the lower cross-brace 186.

The second reel support assembly 190 is essentially identical to the first reel support assembly 180. Assembly 190 includes upper roller elements 192 supported on an upper cross member 194 and lower roller elements 198 supported on a lower cross member 196.

The reel support assemblies 180 and 190 are preferably space inwardly from the outer ends of the reel 172 so as to minimize bending moments acting on the reel 172 due to the weight thereof.

It can be appreciated that the reel 172 is able to rotate within the reel support assemblies 180 and 190. The reel assembly 170 is preferably constructed and arranged for powered rotation. Such powered rotation could be provided by providing powered rotation in one or more of the roller elements 182, 188, 192, 198, or the reel 172 may be coupled to a rotating shaft of a power unit (not shown) by a power transmission mechanism such as a gear arrangement or a chain and sprocket arrangement.

In addition, the reel assembly 170 is preferably coupled by a rotation transmission mechanism (not shown) to the translation of the module 100 so as to selectively rotate in a hose unrolling direction as the module 100 moves forward and to selectively rotate in a hose rolling direction as the module 100 moves backward.

The reel assembly 172 preferably also includes a brake mechanism for selectively preventing rotation of the reel 172. Such a brake mechanism could be provided in one or more of the roller elements 182, 188, 192, 198, which would also brake the reel 172 because of the frictional contact between the rollers and the reel. Alternatively, a brake mechanism could be provided which directly engages the reel 172.

Figure 4:
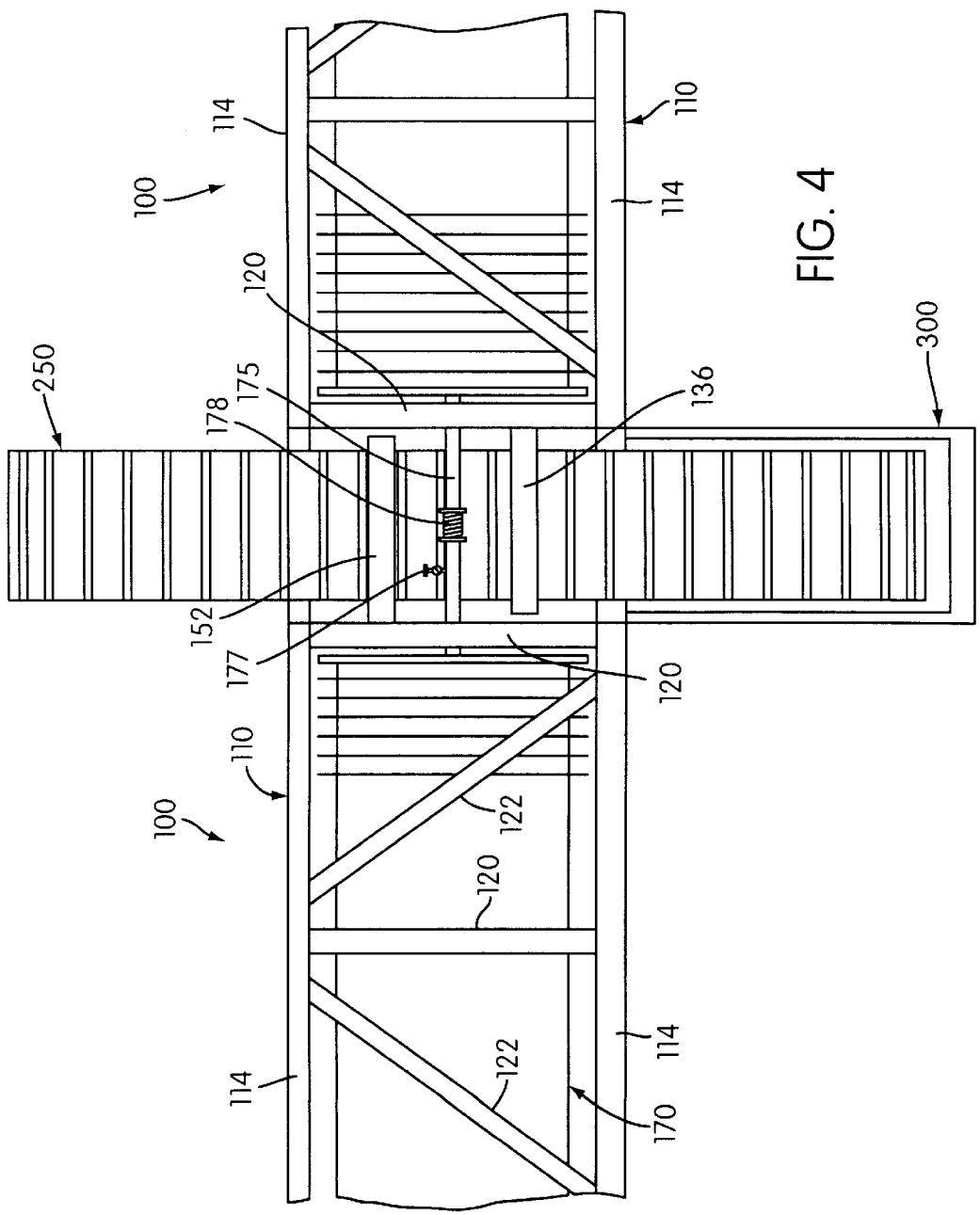
FIG. 4 is a partial plan view of the apparatus of the present invention.

Each fluid distribution apparatus 50 is coupled to one of the main pipes 40 and 38, such as by a flexible hose 104 connected to respective couplings at the pipe 40 or 38 and the distribution apparatus 50. As shown in FIGS. 2, 4 and 6, each axially elongated reel assembly 170 of each module 100 has a conduit 175, preferably a pipe, extending centrally therethrough and defining an interior fluid passage. The individual modules 100, are coupled to one another to permit fluid to flow one to the next by couplings 178 connecting the pipes 175 of adjacent units. To accommodate relative movement of one of the modules 100 with respect to an adjacent module 100, coupling 178 is preferably a spool type expansion joint used for connecting adjacent sections of piping. A valve 177 is preferably provided for shutting off fluid flow through pipe 175.

A plurality of individual fluid distributors, preferably in the form of fluid distributing, elongated flexible tubes 176 are individually coupled to the central pipe 175 of each module 100. The flexible tubes 176 may distribute fluid therefrom in any of a variety of ways. The tubes 176 may be porous or perforated, with holes arranged in any manner, such as linearly, randomly, or in regular patterns, or the tubes may include spaced-apart discrete distributing elements, such as water emitting fittings or sprinklers. In the preferred embodiment, the fluid distributors comprise lengths of flexible tube 176 coupled at one end to central pipe 175 and closed at a remote end and having a series of perforations formed along the length. For simplicity, the fluid distributors will be referred to hereinafter as "hoses" or "perforated hoses". The hoses 176 are deployed behind the apparatus 50 in a side by side, generally parallel arrangement, and fluid flows through each of the hoses 176 and through the perforations thereof so as to be distributed over the leach field for percolating through the ore. The hoses 176 may be rolled up onto the reel assembly 170 to transport the hoses from one location on the leach field to another.

A flow rate sensitive shut-off valve is preferably provided between the main pipes 38, 40 and the apparatus 50 to shut off flow to the apparatus if flow rate into the apparatus exceeds a predefined threshold level. Accordingly, if a pipe or hose break should occur in the apparatus, resulting in high fluid flow rate, fluid to the apparatus is shut off. The shut-off valve may be used in conjunction with a visible and/or audible alarm to notify operators that a shut off has occurred.

Each hose 176 is preferably coupled to the reel 172 and the fluid supply by means of a pipe 177 extending radially from the central pipe 175 through an outer wall of the reel 170 and having an L-shaped end fitting 173 connected to the hose 176. Alternatively, each hose 176 could be connected to a flexible fitting at the end of a conduit emanating from the central pipe 175 and extending through the reel 172, the flexible fitting permitting the hose 176 to be directed in a circumferential direction with respect to the reel 172.

Each hose 176 is preferably perforated black polyethylene tubing having a preferred outside diameter of 5/8 inches. To withstand the large tensile stresses to which the hose 176 may be subjected when dragging the hose across the heap during forward translation of the fluid distribution apparatus 50 or during wind-up of the hose 176 while the fluid distribution apparatus 50 is kept stationary, it may be desirable to provide a length of hose extending from the fitting 173 for a specified distance which is of greater strength than the remaining portion of 5/8 inch black polyethylene hose. Such an initial hose portion may comprise hydraulic power grade reinforced hoses.

Each module 100 preferably includes a tube guide 200 for directing the hoses 176 extending off the reel 172 to a position below the lower longitudinal stringer 112 of the frame 110. The tube guide 200 includes mounting brackets 202, 206 extending down from lateral cross members 132 and 155, respectively, and a longitudinal guide bar 204 extending therebetween. Guide bar 204 may be a cylindrical member rotatably mounted in the brackets 202 and 206 so as to facilitate movement of the hoses 176 with respect to the guide 200. Also, guide bar 204 preferably has a diameter large enough so as to avoid placing a sharp bend or kink in the hoses 176, bent therearound.

Each module 100 preferably also includes a frame mounted sprayer system 205 as shown in FIG. 5. Sprayer system 205 includes a pipe or other suitable conduit 210 extending longitudinally along one of the lower longitudinal stringers 112 and is coupled to the fluid pipe 175. A plurality of equally spaced sprayer units 208 are provided along the longitudinal extent of the pipe 210 and can be used to selectively spray fluid onto the heap directly from the frame 110 with the apparatus 50 translating forward or backward or with the apparatus 50 stationary.

Figure 7:
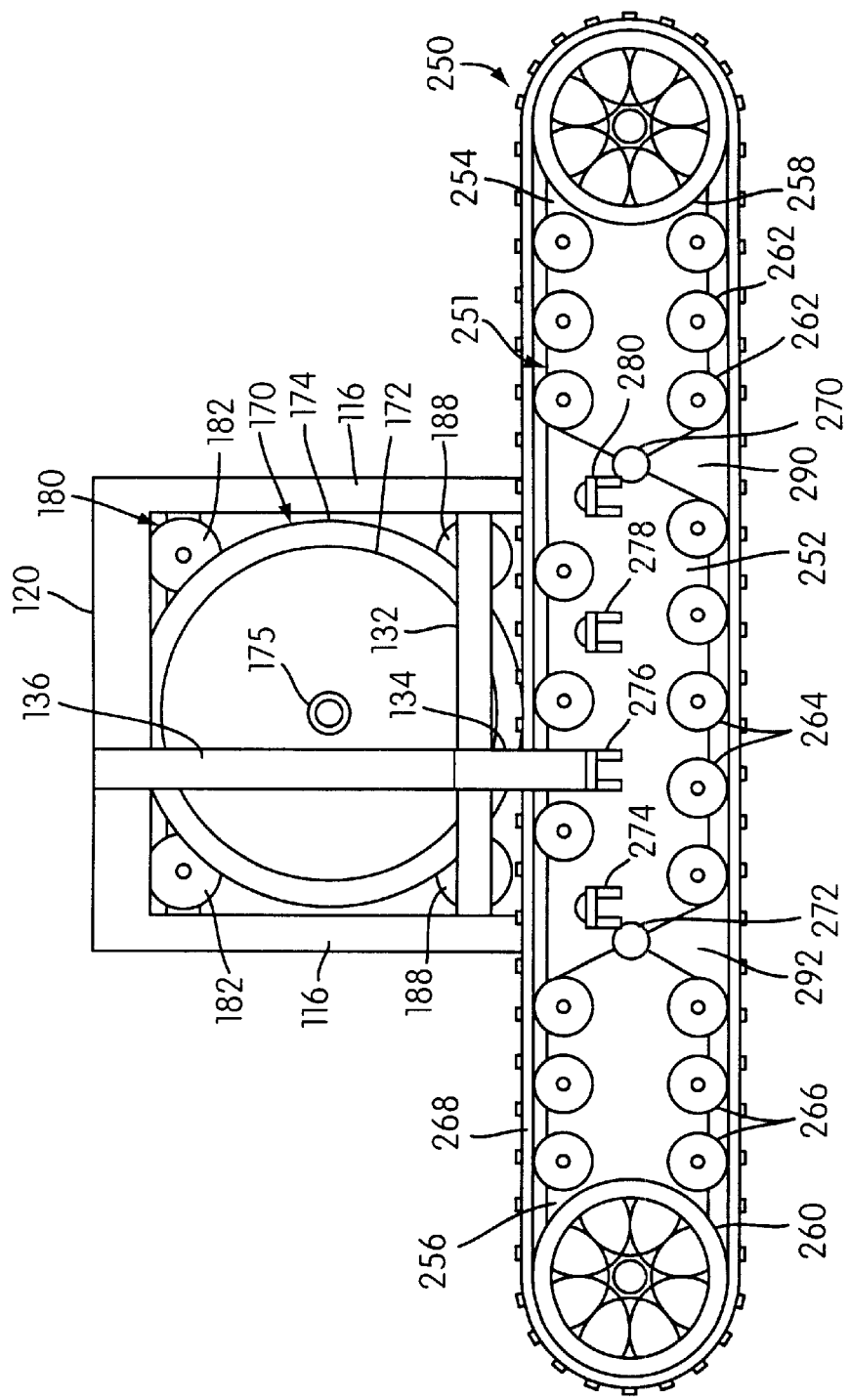
FIG. 7 is an end view showing the frame and reel assembly as well as an endless track crawler unit of the apparatus of the present invention.
Figure 8:
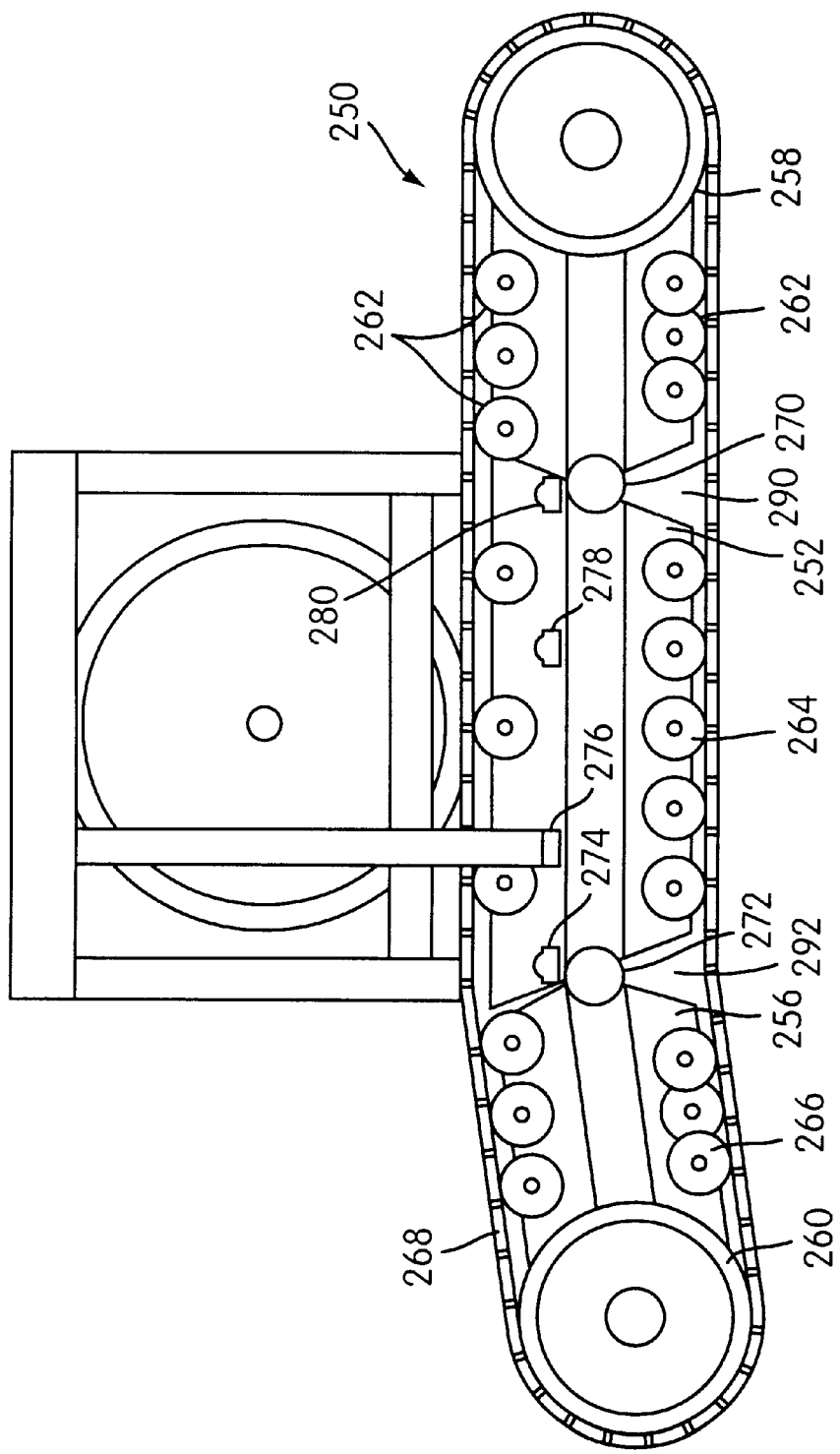
FIG. 8 is an end view similar to the end view of FIG. 7 showing the ability of the crawler unit to articulate to accommodate transitions in slope.

The details of the crawler units 250 are shown in FIGS. 7 and 8. The crawler unit 250 includes a frame 251 which comprises middle structure 252 and end structures 254, 256. End wheels 258 and 260 are rotatably mounted within the end structure 254 and 256, respectively, and an endless track 268 extends about the frame 251 and the end wheels 258 and 260. Middle structure 252 and end structures 254 and 256 may include a plurality of rotatably mounted roller elements 264, 262, 266, respectively, for supporting the endless track 268 in rolling contact therewith.

The crawler unit 250 is preferably articulated so that, as shown in FIG. 8, a portion of the crawler can articulate with respect to the remainder of the crawler to accommodate changes in ground slope. Without the ability to articulate, the crawler 250 would merely translate forwardly onto a downwardly sloped grade without contacting any portion of the downwardly sloped grade until the center of gravity of the apparatus was far enough forward and the whole apparatus would tip downwardly in a jolting manner. An articulating crawler unit 250 allows the apparatus to transition onto a downward slope with less jolting to the apparatus.

Articulation is provided by a pivot mount 270 between end structure 254 and middle structure 252, with a gap 290 between the adjacent structures, and a pivot mount 272 between end structure 256 and middle structure 252 with a gap 292 between the adjacent structures. In the illustrated embodiment, the gaps 290, 292 between the end structure 254 and middle structure 252 and between end structure 256 and middle structure 252, respectively, are only provided below the respective pivot points 270, 272. Hard contacts between the end structure 254 and the middle structure 252 and between the end structure 256 and the middle structure 252 are provided above the pivot points 270, 272, respectively, when the crawler 250 is on a level grade so that the ends 254 and 256 are not permitted to articulate upwardly with respect to the middle portion 252. Upward articulation may be provided, but for the present application, downward articulation is most important so as to minimize sudden tipping of the apparatus when transitioning onto a downward slopping grade. Sudden jolting is usually not a problem when the apparatus transitions onto an upwardly sloping grade, and, therefore, upward articulation of the end structures 254 and 256 is not as important as downward articulation.

Each crawler unit 250 would include a track driving mechanism (not shown) including a power plant and a transmission which drives one or both of the end wheels 258, 260 to drive the track 268. In the preferred embodiment, the power plant for the track driving mechanism is an electrically powered hydraulic motor such as is used in the crawler units 36 and 28 of the stacker conveyer system 32 and the cleaner conveyer system 24, respectively.

The reel assembly 170 is preferably coupled to the crawler units by an appropriate transmission mechanism to cause the reel 172 to rotate as the crawler units 250 move apparatus 50 forward or backward. As the distributing apparatus 50 moves forward, the reel rotating transmission can be engaged to cause the reel 172 to unwind each of the hoses 176 as the apparatus moves forward, the amount of hose being unrolled corresponding to the forward distance traveled. With the hoses deployed behind the apparatus 100, the apparatus can be kept stationary while the hoses distribute fluid over the heap, or the apparatus 50 can move forward to drag the hoses across the heap. To rewind the hoses, the apparatus 50 can be moved in a reverse direction and the reel rotating transmission engaged to rotate reel 172 to wind up the hoses 176 as the apparatus moves backwards. Alternatively, after the hoses 176 are completely unwound from the reel 172, movement of the apparatus can continue in a forward direction to rewind the hoses on the reel in an opposite direction.

Alternatively, a reel rotating mechanism can be provided which works independently of the movement of the crawler units, and the reel can be rotated in the wind up direction while the apparatus is held stationary to drag the hoses towards the apparatus 50 while winding them onto the reel assembly 170.

Figure 9:
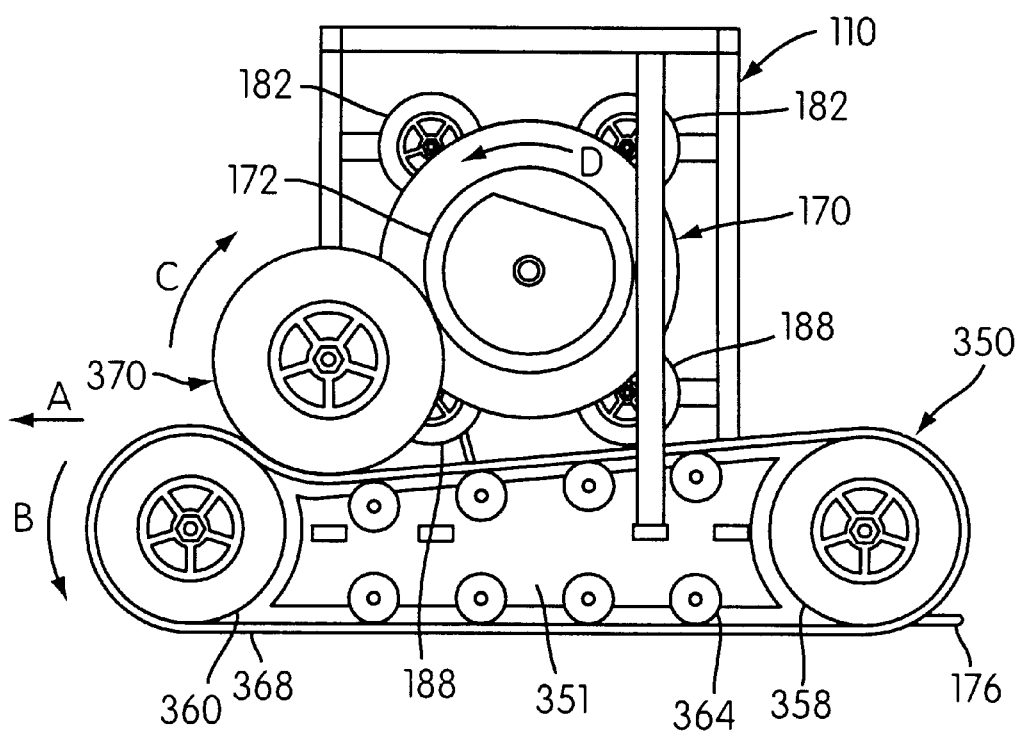
FIG. 9 is an end view of an alternate embodiment of a propulsion and reel-rotating mechanism of the apparatus of the present invention.

An example of a reel-coupling transmission is shown in FIG. 9. The frame 110 is supported and transported by non-articulating crawler unit 350. Crawler unit 350 includes a main frame 351, rotatably mounted main wheels 358, 368, guide wheels 364, and endless track 368. A coupling wheel 370 is rotatably mounted to frame 110 and is disposed between the crawler unit 250 and the reel assembly 170. Specifically, coupling wheel 370 is in rolling frictional contact with reel 172 and the track 268. In the illustrated embodiment, coupling wheel 370 presses track 268 between its outer periphery and the outer periphery of main wheel 368. When the apparatus moves forward in direction indicated by arrow "A", the track 268 and main wheel 360 rotate counterclockwise in direction "B", thus driving coupling wheel 370 clockwise in direction "C", and ultimately rotating reel 172 counterclockwise in direction "D". The hoses 176 will unwind from reel 172 as the unit moves forward so as to be deployed behind the unit. The diameters of the main wheel 360, coupling wheel 370, and reel 170 are tailored so that the length of hose unwound from the reel corresponds to the distance the unit moves forward. When the apparatus moves backward, opposite to direction "A", rotations of the main wheel 360, the coupling wheel 370, and the reel 172 are reversed, and the hoses 176 are wound up onto the reel 172.

The reel coupling transmission is preferably disengagable by a clutch or other disengaging mechanism so that the apparatus 50 can be moved forward or backward without any corresponding reel rotation. The reel coupling transmission of FIG. 9 preferably includes means, such as a lever mechanism or a hydraulically actuated device, for moving coupling wheel 370 out of engagement with the reel 172 and/or the track 268 to disengage the reel 172 from movement of the crawler unit 350.

When the entire length of the hoses, or some desired, shorter length, is unrolled from the reel, as determined by a spotter or by monitoring the number of reel rotations, the reel can be disengaged to stop hose deployment. The apparatus can then remain stationary while fluid is run through the hoses and onto the heap surface, and/or a brake can be applied to the reel 172 and the apparatus can be moved forward to drag the hoses across the heap surface.

In addition, the reel coupling transmission may have additional gearing for reversing rotation of the reel 172 without reversing the direction of translation of the apparatus. For example, in the reel coupling transmission of FIG. 9, if reel coupling wheel 370 were replaced with two coupling wheels, one engaged with the track 368, one engaged with the reel 172, and both engaged with each other, rotation of the reel would be reversed as compared to rotation caused by the single coupling wheel 370.

Figure 10:
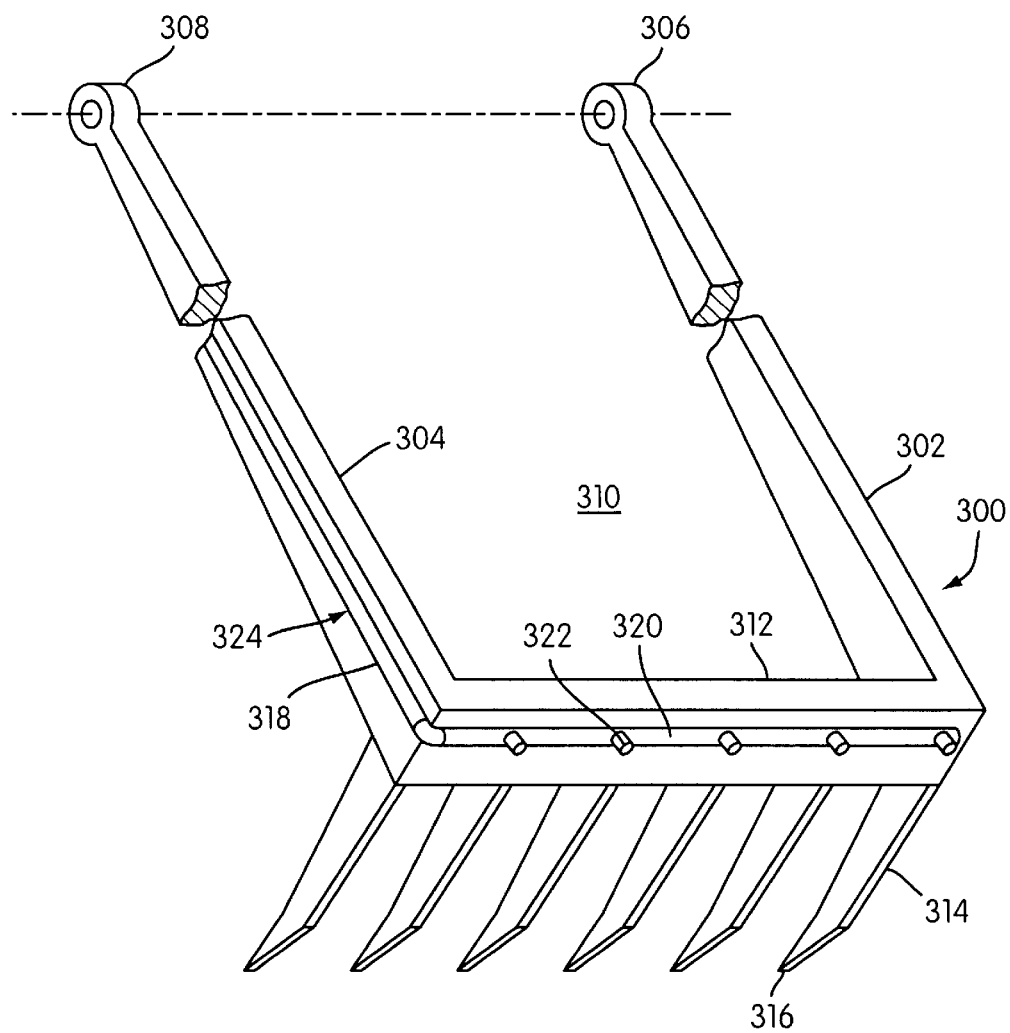
FIG. 10 is a broken perspective view of a chisel plow assembly of the apparatus.
Figure 11:
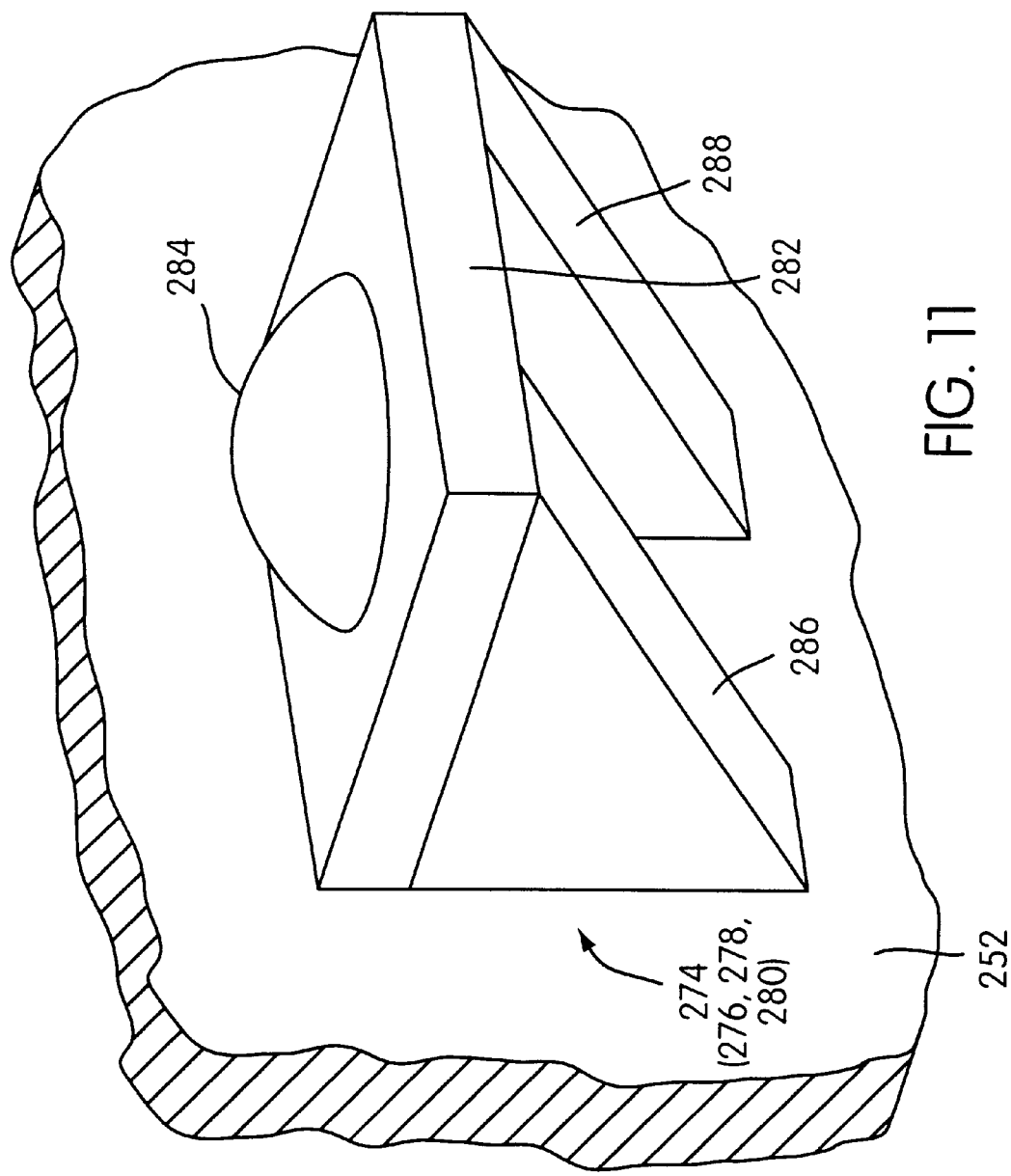
FIG. 11 is an enlarged perspective view of a frame support bracket of the apparatus.

To assemble the apparatus 50 across the width of the heap of the leach field, it is necessary to couple the frames 110 of adjacent modular units 110 with the crawler units 250 and with each other. Each crawler unit 250 includes a number of frame receiving support brackets attached to both sides of the middle structure 252. In the illustrated embodiment, crawler 250 includes four frame receiving support brackets, 274, 276, 278 and 280 on each side of middle structure 252. As shown in FIG. 10, each frame receiving support bracket preferably includes a generally horizontal shelf 282 supported therebelow by gusset structures 286 and 288. The gusset structures 286 and 288 and the shelf 282 are preferably formed of plate steel and are welded to one another and the entire bracket is welded to the outer wall of the middle structure 252.

Each frame 110 includes an inboard coupling structure for engaging one or more of the brackets 274, 276, 278 and 280 on the side of the crawler unit 250 facing the frame 110 and an outboard coupling structure for engaging one or more of the brackets on an opposite side of the crawler unit 250. As shown in FIGS. 3 and 5, in the illustrated embodiment, the inboard coupling structure includes longitudinal extensions 142 and 144 extending from the lower longitudinal stringers 112 on one end of the frame 110 and extension 160 and 162 (see FIG. 5), on the opposite end of the frame 110. The extensions 144, 142 engage the outer most brackets 274, 280 of the crawler unit 250 by resting thereon to support the end of the frame 110 on the crawler unit 250.

The underside of the extension 144, 142 may include a hollow, recessed portion for receiving therein a convex surface 284 of the bracket 274, 280 as shown in FIG. 10. The convex surface 284 extended within the recessed portions beneath the inboard extensions 142, 144 creates a ball and socket connection which prevents lateral translation of the frame 110 with respect to the brackets 274, 280.

In the illustrated embodiment, the outboard coupling structures comprise endwise frame extension 130 and endwise frame extension 150. Frame extension 130 includes a first angled member 136 extending downwardly from an endmost upper lateral stringer 120 at an angle of preferably around 45°. A vertical member 134 extends down from a lower end of the angled member 136. A vertical member 140 extends between the end-most upper lateral stringer 120 and the cross member 132, and a horizontal brace 138 extends between the vertical member 140 and the angled portion 136. An additional angled member 146 may be provided between the angled portion 136 and the intersection of horizontal brace 138 and vertical member 140.

Similarly, endwise extension 150 includes a first angled member 152, a vertical member 154 extending downwardly from the free end of first angled member 152, a vertical member 158 extending between end-most upper lateral stringer 120 and cross member 155, and a horizontal brace 156 extending between the first angled member 150 and the vertical member 158. A second angled member 157 between the first angled member 152 and the intersection of the horizontal brace 156 and the vertical member 158 may be provided.

The endwise extensions 130 and 150 are constructed and arranged so that the space between the inboard coupling structure and the outboard coupling structure, e.g. between the extension 142 and the first vertical member 134, is sufficient to accommodate the width of a crawler unit 250 so that when extension 142 and 144 are engaged with the brackets 274 and 280 on a side of the crawler unit 250 facing the frame 110, the bottom portion of the vertical member 134 engages one of the intermediate brackets 276, 278 on the opposite side of the crawler unit 250. Again, the bottom end of the vertical portion 134 may include a recess to receive the convex surface 284 of the bracket.

As shown in FIG. 4, the endwise extensions 130 and 150 on opposite ends of the frame 110 are offset laterally with respect to one another. Thus, two adjacent frames 110 are coupled to an intermediate crawler unit, and therefore to each other, by engaging the longitudinal extensions 142, 144 of the first frame and the endwise frame extension 150 of the second frame with three of the four frame-receiving support brackets on the side of the crawler unit 250 facing the first frame and engaging the longitudinal extensions 160 and 162 of the second frame and the endwise frame extension 130 of the first frame with three of the four frame-receiving support brackets on the side of the crawler unit 250 facing the second frame. Accordingly, it can be appreciated that the modules 100 can be easily coupled to one another and can also be easily uncoupled from one another if one of the modules 100 in the apparatus 50 must be repaired or replaced.

A chisel plow 300, as shown in FIGS. 2 and 9, may be pulled behind each of the crawler units 250 to loosen up ore compacted by the weight of the distributing apparatus 50. The chisel plow 300 may comprise a U-shape structure having two arms 302 and 304 extending rearwardly from the crawler unit 250 and pivotally attached thereto at end portions 306 and 308, respectively. Arms 302 and 304 are connected at the ends thereof by a cross portion 312. A plurality of chisel teeth 314 extend downwardly from the cross portion 312, and each tooth 314 has a chisel point 316 for digging into the compacted ore.

Because neither the hoses 376 carried by the reel assembly 170 nor the framed mounted sprayer system 204 distribute fluid onto the area of the heap over which the crawlers 250 move, a plow mounted sprayer system 324 is preferably provided. Plow mounted sprayer system 324 includes a first pipe portion 318 extending along one or both the arms 304, 302 from the fluid supply on the frame 110, such as the pipe 175. A second portion of the pipe 320 extends laterally from the first portion 318 and includes a plurality of nozzles 322 for spraying fluid onto the area of the heap over which the chisel plow has just passed and loosened the compacted ore.

It will be realized that the foregoing preferred specific embodiment of the present invention has been shown and described for the purposes of illustrating the functional and structural principles of this invention and are subject to change without departure from such principles. Therefore, this invention includes all modifications encompassed within the spirit and scope of the following claims.

What is claimed is:

1. A mobile apparatus for distributing fluid onto a surface, said apparatus comprising:
   a plurality of elongated frames arranged end-to-end, each of said plurality of elongated frames having structure for operatively coupling opposed ends thereof to adjacent ones of said plurality of elongated frames;
   a frame propulsion mechanism associated with each end of each of said plurality of elongated frames for supporting each end of each elongated frame and for propelling said plurality of elongated frames in unison, each said elongated frame including propulsion mechanism coupling structure at each end thereof, and each said frame propulsion mechanism including frame coupling structure constructed and arranged to (1) be engaged by said propulsion mechanism coupling structure of a first associated elongated frame to operatively couple said first associated elongated frame to said frame propulsion mechanism and (2) to be engaged by the propulsion mechanism coupling structure of a second associated elongated frame adjacent to said first associated elongated frame to operatively couple said second associated elongated frame to said frame propulsion mechanism and to couple said second associated elongated frame to said first associated elongated frame; and
   an axially elongated reel assembly rotatably carried by each of said plurality of elongated frames, each axially elongated reel assembly being constructed and arranged to support thereon a plurality of lengths of flexible tubing wound upon said axially elongated reel assembly at different axial positions therealong, each said axially elongated reel assembly including:
   a fluid passageway extending along said axially elongated reel assembly,
   primary connection devices disposed at opposite ends of said fluid passageway, each primary connection device being constructed and arranged to couple an end of said fluid passageway in fluid communication with either an external fluid source or a fluid passageway of an axially elongated reel assembly of an adjacent elongated frame, and
   a plurality of secondary connection devices disposed at spaced apart positions along said fluid passageway, each secondary connection device being constructed and arranged to connect a length of flexible tubing in fluid communication to said fluid passageway.

2. The mobile apparatus of claim 1 further comprising a reel drive mechanism constructed and arranged to rotate each said axially elongated reel assembly in one direction to wind up each of a plurality of lengths of flexible tubing onto said axially elongated reel assembly and in an opposite direction to unwind each of the plurality of lengths of flexible tubing from said axially elongated reel assembly.

3. The mobile apparatus of claim 2 further comprising a reel coupling mechanism constructed and arranged to selectively couple said reel drive mechanism with said frame propulsion mechanism to cause each said axially elongated reel assembly to rotate so as to unwind each of the plurality of lengths of flexible tubing from said axially elongated reel assembly as said elongated frame is propelled in a forward direction by said frame propulsion mechanism and to cause said axially elongated reel assembly to rotate so as to wind up each of said plurality of lengths of flexible tubing about said axially elongated reel assembly as said elongated frame is propelled in a rearward direction by said frame propulsion mechanism.

4. The mobile apparatus of claim 3 wherein said frame propulsion mechanism comprises a crawler unit including a frame with main rollers rotatably mounted on opposite ends thereof and an endless track supported for movement on said main rollers for movement about said frame, said axially elongated reel assembly comprises an axially elongated reel extending from one end of said elongated frame to an opposite end thereof, and said reel coupling mechanism comprises a coupling wheel rotatably carried by said elongated frame and in rolling contact with an outer surface of said axially elongated reel and an outer surface of said endless track at a one of said main rollers.

5. The mobile apparatus of claim 1 further comprising a plurality of lengths of fluid-permeable hose, each of said lengths being coupled to a one of said plurality of secondary connection devices of each said axially elongated reel assembly.

6. The mobile apparatus of claim 5 wherein each of said plurality of lengths of fluid permeable hose comprises a perforated polyethylene hose.

7. The mobile apparatus of claim 1 wherein each said axially elongated reel assembly comprises:

an axially elongated reel;

reel support assemblies carried on said elongated frame and constructed and arranged to rotationally support said axially elongated reel on said elongated frame; and a plurality of radially extending divider members disposed about a circumference of said axially elongated reel at a plurality of axially spaced locations along said axially elongated reel.

8. The mobile apparatus of claim 7 wherein each reel support assembly comprises:

two lower roller elements rotatably mounted in spaced-apart relation on a lower cross-brace extending across said elongated frame in a fore and aft direction, said axially elongated reel being rollably supported on said lower roller elements; and a pair of upper roller elements rotatably mounted in a spaced-apart relation on an upper cross-brace extending across said elongated frame in a fore and aft direction and positioned for guiding contact with a top portion of said axially elongated reel.

9. The mobile apparatus of claim 8 wherein said lower roller elements are positioned so that an angle between a vertical line extending through an axis of rotation of said axially elongated reel and a line extending through the axis of rotation of said axially elongated reel and an axis of rotation of either roller element is in the range 30 to 40 degrees.

10. The mobile apparatus of claim 7 comprising two reel support assemblies disposed at positions spaced inwardly from opposed ends of said axially elongated reel.

11. The mobile apparatus of claim 1 wherein said frame propulsion mechanism comprises a crawler unit including a frame with main rollers rotatably mounted at opposite ends thereof and including an endless track supported by said main rollers for movement about said elongated frame.

12. The mobile apparatus of claim 11 wherein said crawler frame comprises a fixed section and an end section pivotally mounted at an end of said fixed section so that said end section can articulate in a vertical direction with respect to said fixed section and conform to slope transitions in the surface.

13. The mobile apparatus of claim 12 wherein said crawler frame further comprises a second end section pivotally mounted at an end of said fixed section opposite the end at which said first mentioned end section is pivotally mounted so that said second end section can articulate in a vertical direction with respect to said fixed section to conform to slope transitions in the surface.

14. The mobile apparatus of claim 1 wherein said elongated frame is constructed from steel members selected from the group including tubular stock and angular stock and wherein said steel members are connected to one another by methods selected from the group including mechanical fasteners and welding.

15. The mobile apparatus of claim 1 wherein said fluid passageway comprises a main pipe extending centrally through said axially elongated reel assembly with a plurality of radially extending conduits branching off said main pipe at axially spaced positions therealong, said primary connection device comprises a spool-type expansion joint, and each of said plurality of secondary connection devices comprises a hose connector disposed at a radial end of each radially extending conduit.

16. The mobile apparatus of claim 1 further comprising a frame-mounted sprayer system, said frame-mounted sprayer system comprising:

a main conduit attached to said elongated frame and disposed along an extent thereof;

a connecting conduit connecting said main conduit with said fluid passageway; and a plurality of sprayers mounted to said main conduit at spaced-apart positions therealong to spray fluid flowing through said connecting conduit and said main conduit onto the surface from said elongated frame.

17. The mobile apparatus of claim 1 wherein said frame coupling structure of said frame propulsion mechanism comprises four frame-supporting brackets mounted at spaced positions along opposite sides of said frame propulsion mechanism, and wherein said propulsion mechanism coupling structure of said elongated frame comprises an inboard coupling structure including two frame extensions at each of the opposite ends of said elongated frame and an outboard coupling structure including an end-wise frame extension extending from each end of said elongated frame and terminating at a spaced-apart position from an end of said elongated frame, each end of said elongated frame being coupled to said frame propulsion mechanism by engaging each of said frame extensions with a one of the support brackets on a side of the frame propulsion mechanism facing said elongated frame and engaging the end-wise frame extension on a one of the support brackets on a side of the frame propulsion mechanism facing away from said elongated frame.

18. The mobile apparatus of claim 1 further comprising a chisel plow pulled behind said frame propulsion mechanism to loosen material compacted by the weight of said frame propulsion mechanism and said elongated frame supported thereby.

19. The mobile apparatus of claim 18 further comprising a plow-mounted sprayer assembly comprising a first conduit, a second conduit extending from said first conduit and connected in fluid communication with said liquid conduit system, and one or more sprayers connected to said first conduit for spraying liquid onto the surface behind said plow.

* * * * *